United States Patent Office 3,101,438
Patented Aug. 20, 1963

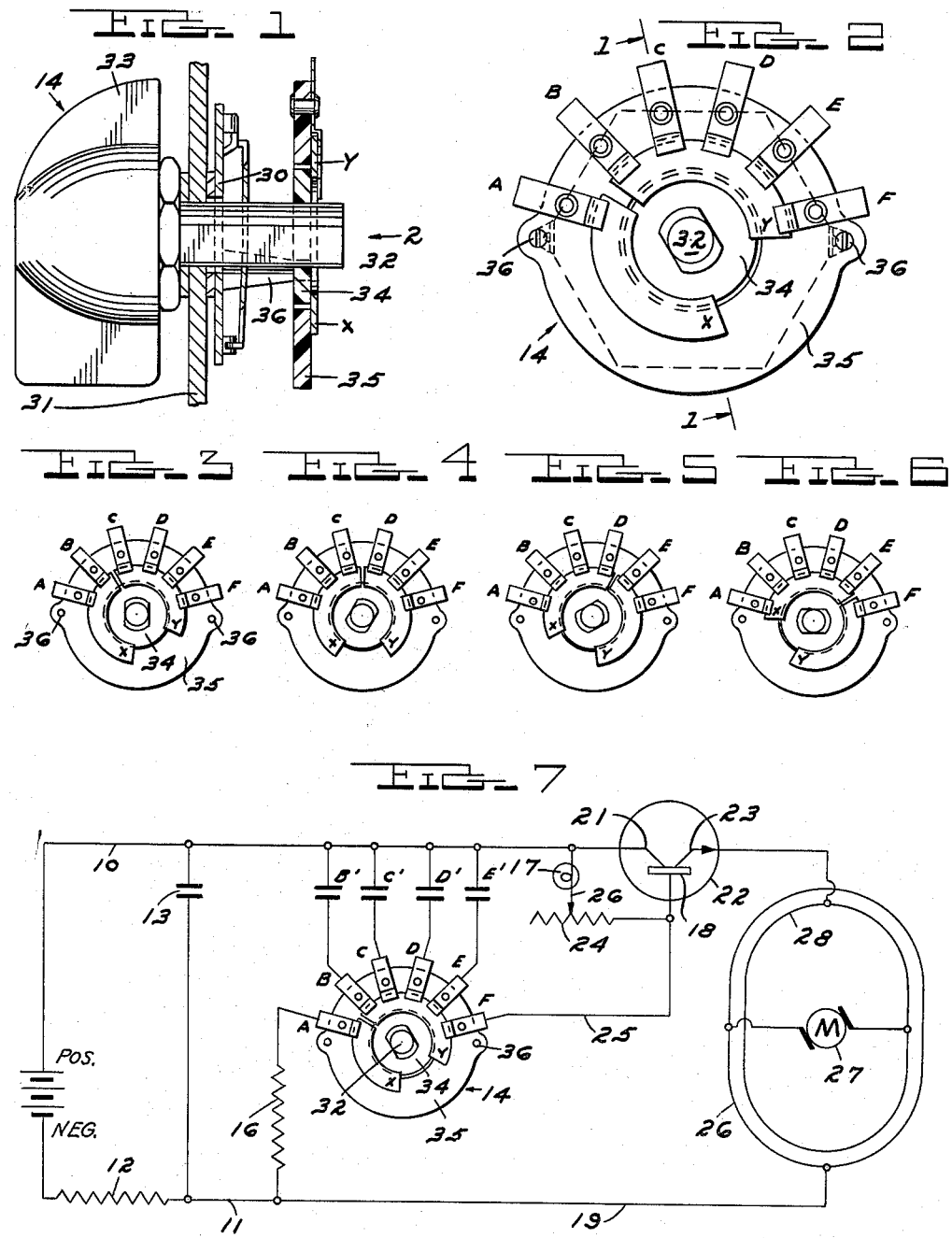

3,101,438
MODEL TRAIN ELECTRICAL MOTOR
CONTROL SYSTEM
William A. McCall, West Bloomfield Township, Oakland
County, Pontiac, Mich. (987 Oakland Ave., Birmingham, Mich.)
Filed May 1, 1961, Ser. No. 106,751
3 Claims. (Cl. 318—400)

This invention relates to an electric motor automatic coasting system particularly suitable for worm and worm gear drives such as for example in model electric trains.

Various types of devices have been employed heretofore to power model electric trains similar to their large size counterparts, however, the several devices of the prior art have not proven entirely satisfactory inasmuch as the worm and worm gear drive has proven highly efficient and due to the fact that it is irreversible upon the termination of current supply, the electric motor armature stops turning causing the wheels to lock.

With the foregoing in view, the primary object of the invention is to provide an electric motor coasting device which is simple in design and construction, inexpensive to manufacture, easy to use, and easy to operate and which facilitates more satisfactory use of a worm and worm gear drive.

An object of the invention is to provide a system having capacitance, so that upon the manual cut-off of power supply, the capacitance causes power to be supplied to the electric motor to effect the coasting.

An object of the invention is to provide several capacitors for single or combined operation to give manual control and adjustment of the coasting time.

An object of the invention is to provide a transistor in the capacitance circuit for controlling the flow of current beyond the capacitance.

An object of the invention is to provide a two sector switch which is capable of selectively combining the capacitors singly or in combination and which also has a sector which is capable of contacting the capacitors singly or in combination for charging the capacitors.

An object of the invention is to provide a resistance and capacitor ahead of the switch and coasting compacitor for the purpose of smoothing out any alternating current waves which have leaked through a medium converting the alternating current to direct current.

An object of the invention is to provide a potentiometer in the transistor and capacitance circuit for the purpose of manually controlling the speed of the motor during running time.

These and other objects of the invention will become apparent by reference to the following description of a motor coasting system embodying the invention taken in connection with the accompanying drawing in which:

FIG. 1 is a vertical cross-sectional view of the switch used in the system taken on the line 1—1 of FIG. 2.

FIG. 2 is a face elevational view of the device seen in FIG. 1.

FIGS. 3, 4, 5, and 6 are reduced views similar to FIG. 2 showing the switch sectors in different positions; and FIG. 7 is a schematic wiring diagram showing the switch and capacitance system for selectively coasting an electric motor.

Referring now to the drawing wherein like numerals refer to like and corresponding parts throughout the several views, the motor coasting system disclosed therein to illustrate the invention comprises a negative lead 10, a positive lead 11 having a resistor 12 disposed therein, a capacitor 13 disposed across the leads 10 and 11 for the purpose of smoothing out any alternating pulsations therebetween, a variable selector switch 14 disposed between the leads 10 and 11 as hereinafter described, capacitors B', C', D', E', connected to switch terminals B, C, D, E; a primary switch terminal A connected to the positive lead 11 via resistor 16, secondary switch terminal F connected to the negative lead 10 via the lead 25, the transistor 22, with the transistor 22 emitter 23 connected to one side of the motor 27 via one rail 28 of the track and with the positive lead 11 connected to the other side of the motor 27 via rail 20 of the track and the lead 19.

It will noted in the operation of the switch that FIGS. 2 and 7 show the switch in the same position with sector Y making connection between secondary terminal F and capacitor terminals B, C, D, E. FIG. 6 shows the opposite of this condition with secondary terminal F merely contacting sector Y while primary terminal A is in contact with capacitor terminals B, C, D, and E through sector X. FIGS. 3, 4, and 5 show conditions between those described with the sectors X and Y selectively contacting as many terminals as desired.

The switch 14 base 30 is mounted on plate 31 housing the shaft 32 which is rotatable by the handle 33 and the shaft 32 carries the core 34 which supports the sectors Y and X while the terminal ring or annular plate 35 is fixedly mounted to the base 30 via the arms 36 and supports the terminals A through D in a stationary position. It can now be understood that by turning the handle 33 that the sectors X and Y are selectively rotatable relative to the terminals as described.

Because worm gear systems provide a practical means of reducing motor speeds to values required as the result, such as for example the driving wheels of model locomotives, they are almost universally used in model railroad systems. However, the transmission of power in these worm gear systems is unidirectional; this refers not to direction of rotation, but is to say, power is transferred from worm to worm-gear and cannot be applied from worm-gear to worm. Therefore model railroad locomotives do not coast after the removal of power as do their actual locomotive counterparts. In effect they have no wheel coasting because of this unidirectional transmission; the worm gear system acts as a very effective brake on the model train when power is removed so that the wheels lock and may slide.

The purpose of this device is to provide a means of coasting the locomotive automatically with the wheels revolving after the manual removal of power. This results in more realistic operation. It also has the advantage of giving the operator of a model railroad system additional control by simulating the effect of brakes which permit wheel turning instead of locking under normal conditions.

This is accomplished as follows: Direct current and voltage is applied to conductor 10 with negative polarity and to conductor 11 with positive polarity and is filtered by resistor 12 and capacitor 13. The resistor and capacitor smoothes the D.C. removing some of the alternating current component usually left by common A.C. to D.C. rectifying systems. Negative conductor 10 is connected to the common negative electrode of one or more condensers or capacitors, A', B', C', and D' to one side of pilot light 17 and to the collector 21 of transistor 22. The emitter 23 of transistor 22 is then connected to track 24 of the model railway system. The base 18 of transistor 22 is connected to potentiometer 24 and by means of conductor 25 to the common terminal F on switch 14.

Another terminal of potentiometer 24 is connected by means of conductor 26 to the other terminal of pilot light 17. The action of the transistor 22 in this circuit is such that when current flows between base 18 and collector 21; a low resistance conducting path is created between emitter 23 and collector 21, hence in this configuration a complete circuit is provided from negative conductor 10 to track 28 through the locomotive motor 27 to track 20, to lead 19, to positive conductor 11. Conversely, if no current flows between base 18 of the transistor and the collector 21, a high resistance path will exist between emitter 23 and collector 21 and therefore, insufficient current will flow in the circuit 10, 28, 20, 19, and 11 to move the locomotive motor 27. By interposing a potentiometer 24 of appropriate value to vary the current flow between base 18 and collector 21, the ability of the transistor 22 to conduct can be varied from almost full conduction to almost zero conduction. Because a very small amount of current flowing in potentiometer 24 can control a proportionately larger current in transistor 22, a much smaller variable resistor can be used than would be required to handle the main tractive current. The pilot light 17 does not have any appreciable effect on this action because of relatively low cold resistance. Its function will be described later.

The capacitors B', C', D', and E' are placed in parallel with pilot light 17 and potentiometer 24 from base 18 to collector 23 and have the following effect. When potentiometer 24 is adjusted so that negligible current flows between base 18 and collector 21 current can flow between emitter 23, base 18, and will charge the capacitors B', C', D', and E' to maximum. When the capacitors are charged to maximum, this charging current can no longer flow. While the capacitors are being charged, current will also flow between collector 21 and emitter 23, thus not noticeably affecting operating of the locomotive. Because capacitors charge at an exponential or low decreasing rate, the current flow between emitter 23 and collector 21 will be varied at a similar low decreasing rate.

Relative to the capacitor circuit, charging time of the capacitor among other things depends upon the capacitance of the capacitor. With no capacity in the circuit there is very little delay between the operation of the transistor and the potentiometer 24. With capacitance in the circuit as shown, the capacitors tend to delay the action of the transistor 22 to some time after the action of the potentiometer 24. The capacitors will discharge when the potentiometer 24 is adjusted to low value thus effectively short circuiting the capacitors. Because this discharge time is relatively short due to low resistance in the external circuit, very large currents tend to flow for very short periods of time. To limit this current to a value that potentiometer 24 can safely handle, pilot light 17 is placed in series with this resistance. This works as follows: The pilot light 17 filament has a very low resistance when cold, however, when a large surge of current flows through this filament, it heats up increasing its resistance substantially. This action has the effect of limiting the discharge current of the capacitor to a nominal value. When this surge has dissipated the filament cools, the resistance lowers, and the bulb again has negligible effect on the circuit.

Relative to train operation and stopping, to realize more realistic effects, a variable time delay is desirable and a switch 14 is provided to progressively switch more capacity into the circuit so that as more capacity is added the delay of stopping is increased. The switch sector Y shown is so constructed that the common terminal F is progressively connected to terminals E, D, C, and B in a series of 4 steps as shown in FIGS. 2 and 7 and these terminals are in turn connected to capacitors E', D', C', and B' respectively. A 5th step on switch, FIG. 6, is provided that opens the circuit, so that no delay is introduced. The action of the switch as it is rotated is as follows: FIG. 6, no delay; FIG. 5, small delay; FIG. 4, medium delay; FIG. 3, large delay; FIG. 2, maximum delay, available with four capacitors B', C', D', and E'. This stimulates the action of brakes very effectively because the rate at which the model locomotive is slowed is now variable. Switch sector X performs another function, that is to progressively charge capacitors B', C', D', and E', when they are not being utilized for delay purposes, through charging resistor 16. While this function is not vital to the action of the circuit it does overcome a difficulty and, therefore, provides a more realistic effect. This difficulty arises from the fact that the operator of the model train may want to vary the delay rate back and forth depending on circumstances of his model railway. When capacitors B', C', D', and E', are in a discharged condition it is their charging current which controls transistor 22. These capacitors cannot charge when potentiometer 24 is at a minimum or if they are switched out of the circuit by switch 14. If potentiometer 24 is increased to some intermediate value, the train will operate at some intermediate speed, if additional capacity is then switched into the circuit by operation of switch 14 this capacitor will then charge and the corresponding charging current will cause transistor 22 to conduct more fully, speeding up the train falsely. By utilizing the other sector X on the switch 14 whose motion is complementary to the sector Y of the switch, charging resistor 16 is connected to common X terminal A and is progressively connected to terminals B, C, D, and E in that order. Because the B, C, D, or E terminals con be connected to only one common terminal A or F at a time, the capacitors B', C', D', and E', are charged only when they are not being utilized for delay. Hence, when the capacitors are switched in for delay purposes they are in a state of charge.

The action of the filter system, capacitor 13 and resistor 12 is helpful to the operation of the delay system and it can be seen that due to the amplifying effect of the transistor 22 it is essential that when locomotive motion is not desired, very little current may be allowed to flow in the base 18, collector 21 circuit. Because of the practical limitations of capacitor manufacture all capacitors are somewhat less than perfect and consequently will allow very small currents to leak through them. This leakage effect is somewhat less when the direct current of the system has had some of the pulsations or A.C. component smoothed out. Without the capacitor 13 and resistor 12 filter there is some small leakage current in the base 18 collector 21 circuit the effect of which is amplified by the transistor 22 and may be of sufficient magnitude to cause the locomotive to creep at very low speeds. With the filter in this circuit the locomotive comes to a full stop and remains stopped indefinitely as desired.

The inventive system with these features constitutes a compact, durable, and easily operable mechanism capable of coasting electric motor with substantial control and with selectivity as to the time, duration and amount of coasting.

Although but a single embodiment of the invention has been shown and described in detail, it is obvious that many changes may be made in the size, shape, detail and arrangement of the various elements of the invention within the scope of the appended claims.

I claim:

1. An electric motor coasting system comprising an electric motor, a negative D.C. lead connected to one side of said motor, a transistor disposed in said negative lead with its collector connected to said lead and its emitter connected to said motor side, a positive D.C. lead connected to the other side of said motor, a multiple selector switch disposed ahead of said transistor having a secondary terminal connected to said transistor base and a primary terminal connected to said positive D.C. lead; a cross resistance disposed between said switch primary terminal and said positive D.C. lead, cross capacitance disposed between said positive and negative D.C. leads ahead of said switch, a line resistance in said positive lead ahead of said line capacitance; said cross capacitance, and line resistance smoothing out the D.C. current flow to prevent current leakage due to residual A.C. wave undulations; said switch having multiple tertiary terminals between said primary and secondary terminals, a rotor on said switch, a primary sector on said rotor in constant contact with said primary terminal, a secondary sector on said rotor in constant contact with said secondary terminal, tertiary lines between said tertiary terminals and said negative D.C. lead, capacitors disposed in said tertiary lines; said rotor and sectors being capable of selective connecting said tertiary terminals with either said primary terminal or said secondary terminal so as to charge said capacitors independent of said motor circuit when connected with said primary terminal and to add stored capacity to said secondary terminal and motor circuit when in contact with said secondary terminal, a shunt circuit between said transistor base and said negative D.C. lead ahead of said transistor, a potentiometer in said shunt circuit for controlling base function for controlling current to said motor to regulate motor speed, and a resistance filament pilot light in said shunt circuit between said potentiometer and said negative D.C. lead to vary transistor current surge via damping resistance; said switch secondary sector being capable of transferring stored capacitance past said shunt circuit potentiometer with said potentiometer at zero to activate said transistor base to effect diminishing current flow through said transistor to diminishingly supply current to said motor to effect gradual slowing down of said motor speed.

2. An electric motor coasting system comprising an electric motor, a negative D.C. lead connected to one side of said motor, a transistor disposed in said negative lead with its collector connected to said lead and its emitter connected to said motor side, a positive D.C. lead connected to the other side of said motor, a multiple selector switch disposed ahead of said transistor having a secondary terminal connected to said transistor base and a primary terminal connected to said positive D.C. lead; said switch having multiple tertiary terminals between said primary and secondary terminals, a rotor on said switch, a primary sector on said rotor in constant contact with said primary terminal, a secondary sector on said rotor in constant contact with said secondary terminal, tertiary lines between said tertiary terminals and said negative D.C. lead, capacitors disposed in said tertiary lines; said rotor and sectors being capable of selectively connecting said tertiary terminals with either said primary terminal or said secondary terminal so as to charge said capacitors independent of said motor circuit when connected with said primary terminal and to add stored capacity to said secondary terminal and motor circuit when in contact with said secondary terminal, a shunt circuit between said transistor base and said negative D.C. lead ahead of said transistor, and a potentiometer in said shunt circuit for controlling base function for controlling current to said motor to regulate motor speed; said switch secondary sector being capable of transferring stored capacitance past said shunt circuit potentiometer with said potentiometer at zero to activate said transistor base to effect diminishing current flow through said transistor to diminishingly supply current to said motor to effect gradual slowing down of said motor speed.

3. An electric motor coasting system comprising an electric motor, a first D.C. lead connected to one side of said motor, a transistor disposed in said first lead with its collector connected to said lead and its emitter connected to said motor side, a second D.C. lead connected to the other side of said motor, a selector switch disposed ahead of said transistor having a secondary terminal connected to said transistor base and a primary terminal connected to said second D.C. lead; said switch having at least one tertiary terminal between said primary and secondary terminals, a rotor on said switch, a primary sector on said rotor in constant contact with said primary terminal, a secondary sector on said rotor in constant contact with said secondary terminal, a tertiary line between said tertiary terminal and said first D.C. lead, a capacitor disposed in said tertiary line; said rotor and sectors being capable of selectively connecting said tertiary terminal with either said primary terminal or said secondary terminal so as to charge said capacitor independent of said motor circuit when connected with said primary terminal and to add stored capacity to said secondary terminal and motor circuit when in contact with said secondary terminal, a shunt circuit between said transistor base and said first D.C. lead ahead of said transistor, and a potentiometer in said shunt circuit for controlling base function for controlling current to said motor to regulate motor speed; said switch secondary sector being capable of transferring stored capacitance past said shunt circuit potentiometer with said potentiometer at zero to activate said transistor base to effect diminishing current flow through said transistor to diminishingly supply current to said motor to effect gradual slowing down of said motor speed.

References Cited in the file of this patent

Haning, Transistor Throttle, Model Railroader, vol. 27, No. 11, pp. 56–59, November 1960.